US006044917A

United States Patent [19]

Brunhoelzl

[11] Patent Number: 6,044,917

[45] Date of Patent: Apr. 4, 2000

[54] PNEUMATIC TOOL WITH SIDE EXHAUST

[76] Inventor: George Brunhoelzl, 240 W. Hoffman Ave., Lindenhurst, N.Y. 11757

[21] Appl. No.: 08/617,040

[22] Filed: Mar. 18, 1996

[51] Int. Cl.[7] .................... B23B 45/04

[52] U.S. Cl. .................... 173/93.5; 173/168; 173/170; 173/218

[58] Field of Search .................... 173/168, 169, 173/170, DIG. 2, 93, 93.5, 218

[56] References Cited

U.S. PATENT DOCUMENTS

| | | | |
|---|---|---|---|
| 3,502,158 | 3/1970 | Snider | 173/12 |
| 3,951,217 | 4/1976 | Wallace et al. | 173/169 |
| 4,236,589 | 12/1980 | Griffith | 173/169 |
| 4,324,275 | 4/1982 | Ward | 137/876 |
| 4,384,622 | 5/1983 | Koziniak | 173/123 |
| 4,476,942 | 10/1984 | Elkin | 173/169 |
| 4,643,263 | 2/1987 | Karden | 173/169 |
| 5,022,469 | 6/1991 | Westerberg | 173/170 |
| 5,228,523 | 7/1993 | Rahm | 173/169 |
| 5,303,781 | 4/1994 | Lin | 173/169 |
| 5,309,714 | 5/1994 | Putney et al. | 60/407 |
| 5,320,177 | 6/1994 | Shibata et al. | 173/48 |
| 5,377,769 | 1/1995 | Hasuo et al. | 173/169 |
| 5,531,279 | 7/1996 | Biek | 173/93.5 |
| 5,591,070 | 1/1997 | Kachlich | 173/169 |

*Primary Examiner*—Scott A. Smith
*Attorney, Agent, or Firm*—Dilworth & Barrese

[57] ABSTRACT

The present invention relates to a pneumatic tool having a housing including a motor housing portion which is pneumatically and securely connected to a handle housing portion. The motor housing portion has a motor housing exhaust opening with a motor housing exhaust opening port therethrough. The motor housing exhaust opening port functions to direct pressurized air from a forward direction to a sideways direction.

9 Claims, 5 Drawing Sheets

PNEUMATIC TOOL WITH SIDE EXHAUST

BACKGROUND

1. Technical Field

The present invention relates to a pneumatic tool. More particularly, the present invention relates to a pneumatic tool having a handle housing portion and a motor housing portion and a side exhaust formed in a sidewall of the motor housing portion.

2. Background of Related Art

Pneumatic tools, such as impact wrenches, are well known in the prior art. Prior art pneumatic tools include an air driven rotor having an air inlet port and an air exhaust port. Typically, the air exhaust port is positioned to direct air exhaust from the front of the tool in a forward direction. One problem associated with forward exhaust pneumatic tools is that dust particles and other debris positioned on a work surface are driven by the exhaust gas into the face of the user, causing a safety hazard during operation of the pneumatic tool.

Numerous innovations for pneumatic impact tools have been provided in the prior art. Even though these innovations may be suitable for the specific individual purposes to which they address, they differ from the present invention as hereinafter contrasted.

U.S. Pat. No. 3,502,158, titled Air Operated Tool With Rear Exhaust, invented by Snider, discloses an air operated tool having air exhaust passages extending from the air motor to the rear of the tool axially offset from the air inlet passages and control valve therefore for directing the exhaust air away from the work. An overhose may be telescoped over the air supply hose for directing the exhaust air further from the work while reducing the noise level of the tool.

U.S. Pat. No. 3,951,217, titled Impact Air Wrench Having A Two Position Pressure Regulator, invented by Wallace et al., discloses a pneumatically powered impact wrench having a two position pressure regulator located in a back cap of the housing between a reverse valve and a reversible air driven motor. The regulator is adapted in a selected first position to cause application of full air pressure to the motor and consequent full torque to the work in a direction as determined by the reverse valve, and to cause application in a second selected position of reduced air pressure to the motor and a consequent torque of a predetermined lesser value to the motor in an opposite direction.

U.S. Pat. No. 4,324,275, titled Retrofitting Methods and Retrofitted Hydraulic Drives, invented by Ward, discloses a hydraulic drive retrofitted with an on-off switching facility. To this end, a block is provided having a front portion fitting the drive at adjacent inlet and outlet openings and having a rear portion opposite the front portion. The block is provided with a first through opening leading from the rear portion to the front portion for communication with the outlet opening. The first through opening at the rear portion of the block is adapted for reception of a fitting or a hydraulic fluid return hose which would otherwise have been received in the above-mentioned outlet opening. The block is provided with a valve which is manually actuable to an open position providing an interconnection for reactivation of the drive. The block is mounted on the drive with the front portion fitting the drive at the inlet and outlet openings, the first through opening communicating with the inlet opening, and the second through opening communicating with the outlet opening.

U.S. Pat. No. 4,384,622, titled Impact Wrench With Linear Motion Hammer Adapter, invented by Koziniak, discloses an impact wrench fitted with a hammer mechanism which converts wrench torque to hammer blows. The hammer provides power to a nail feeding mechanism. The nails are in strips in which the nails are in a series one behind another. The feeding mechanism severs the series of nails and completes the formation of nails.

U.S. Pat. No. 5,022,469, titled Exhaust Means For Pneumatic Power Tool, invented by Westerberg discloses a sound depressing exhaust means for a pneumatic power tool with a substantially cylindrical housing (10) and a vane motor (11) with exhaust port means (23). An annular casing (41) surrounds a portion of the housing (10) and four expansion chambers (31—31, 34, 36, 39) are arranged in series and combined with four flow restrictions (33, 37, 30, 35) and a sound trap (38).

U.S. Pat. No. 5,309,714, titled Ratchet Tool With Exhaust chamber Manifold With Sound Dampening Properties, invented by Putney et al., discloses a tool having a housing having two substantially semi-cylindrical members. An air motor in the housing has motor end members located adjacent each end thereof. Two O-rings are disposed between the motor and the end members and are squeezable axially so as to be forced radially outwardly to abut the housing. A manifold includes a chamber of a size that dampens Helmholtz frequencies in the exhaust air.

U.S. Pat. No. 5,320,177, titled Power Driven Hammer Drill, invented by Shibata et al., discloses an improved intermediate housing incorporated in a power driven hammer drill, which is light in weight, easily and safely handled, and inexpensively manufactured.

SUMMARY

In accordance with the present disclosure, a pneumatic impact wrench having a housing having a side exhaust opening is provided. The housing includes a motor housing portion and a handle housing portion. The motor housing portion defines a receptacle which is configured to receive a rotor therein. The handle portion includes an inlet which is adapted to be connected to a pneumatic source. A channel located within the housing extends from the inlet port to the receptacle. The side exhaust opening is formed in a sidewall of the motor housing portion of the housing. The exhaust opening is configured to direct exhaust gas flowing from the rotor in a direction away from the longitudinal axis of the rotor.

BRIEF DESCRIPTION OF THE DRAWINGS

Various preferred embodiments are described herein with reference to the drawings, wherein.

DESCRIPTION OF PREFERRED EMBODIMENTS

Figure 1:
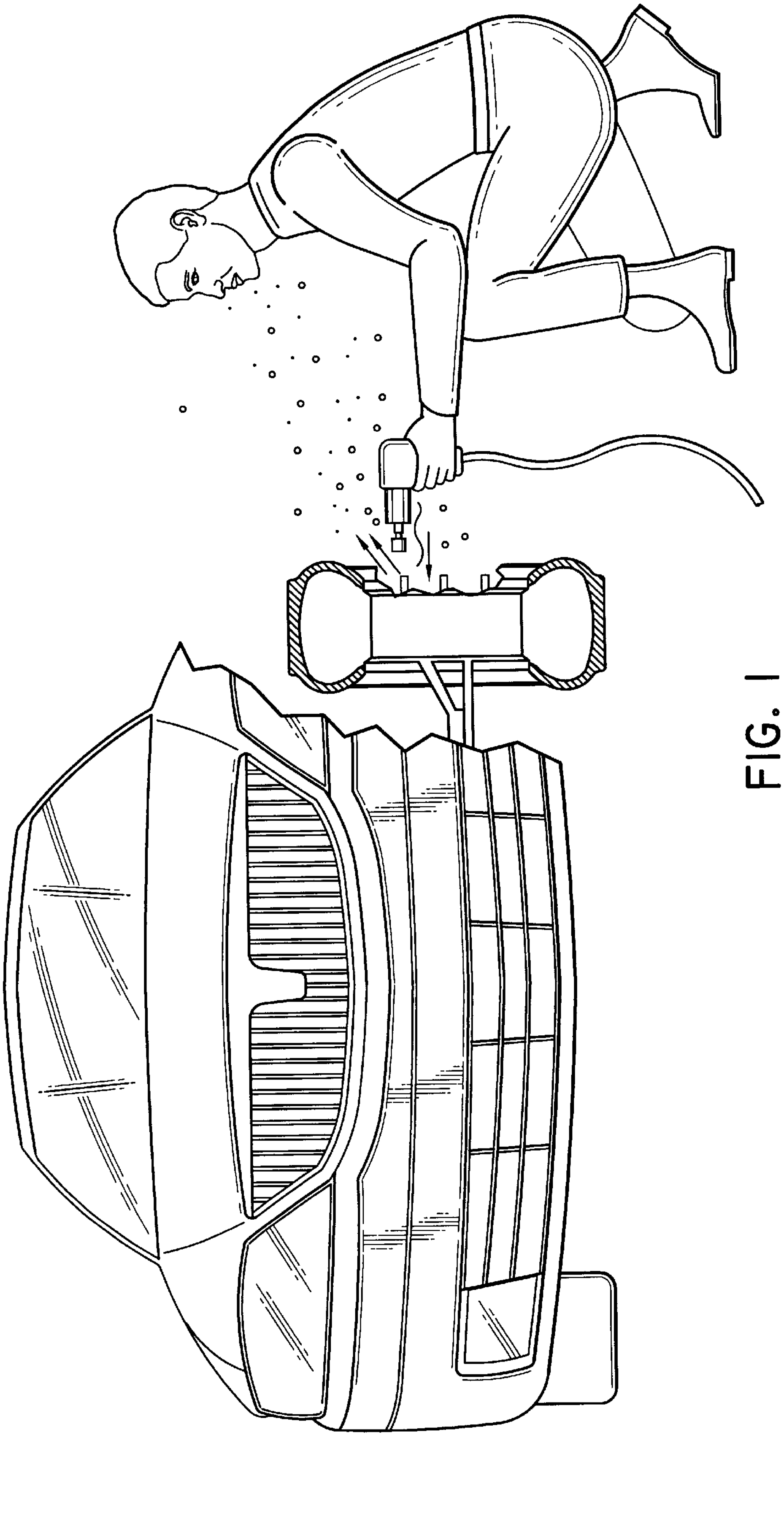
FIG. 1 (PRIOR ART)
FIG. 1 is a front view of a user working with a prior art pneumatic impact wrench having a forward egressing exhaust port.

FIG. 1 illustrates a user working with a prior art pneumatic impact wrench which has a forward egressing exhaust opening. The exhaust gas exiting the exhaust opening causes exhibiting dust particles to fly toward the user's face. If a pneumatic tool has a front forward egressing exhaust port, upon using the tool, pressurized air egresses from the exhaust port and contacts the area which the tool is being utilized on, e.g., a car wheel. The area usually has numerous particles such as brake dust which then is pneumatically propelled by the pressurized air into the user's face resulting in a safety hazard.

Figure 2:
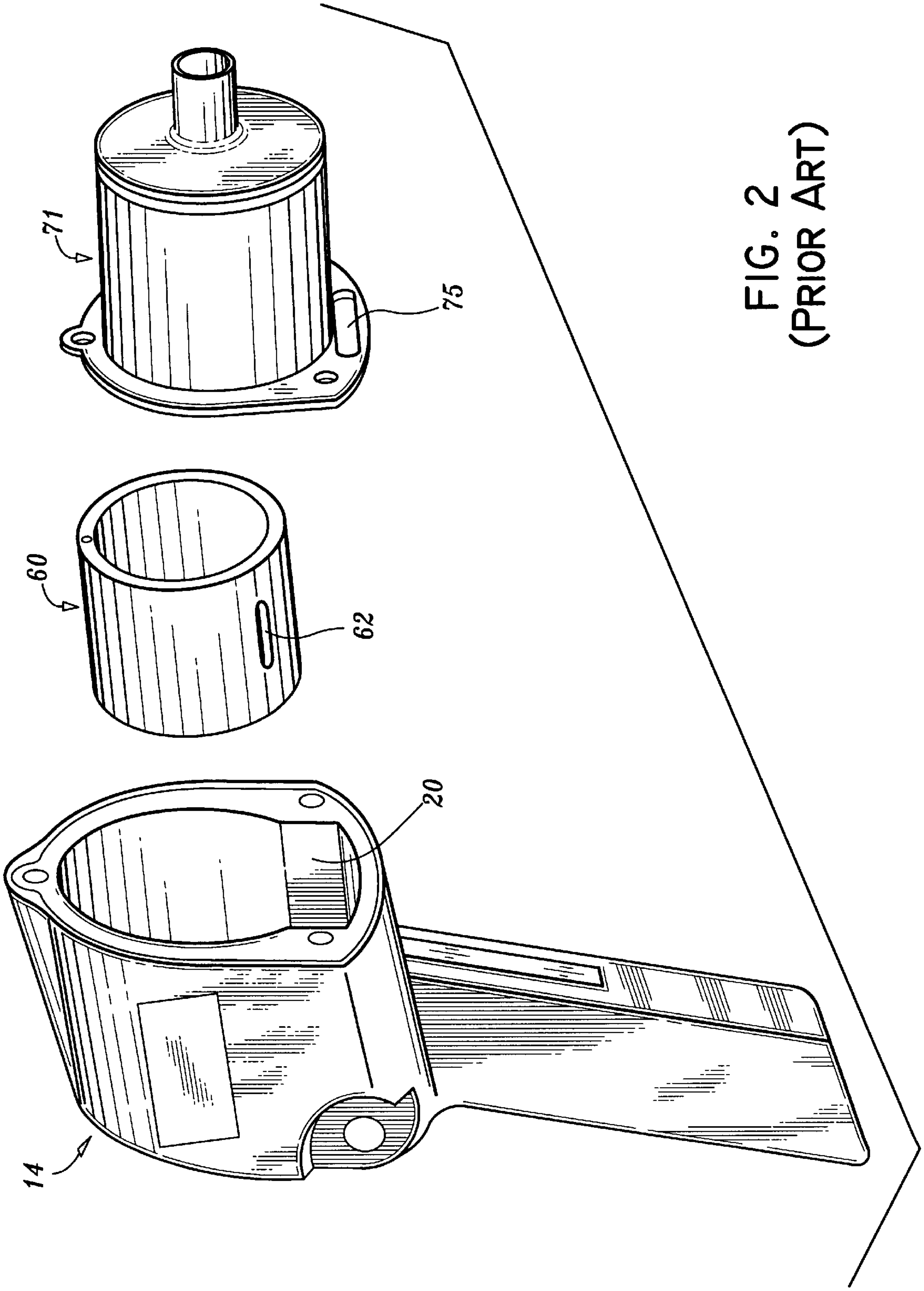
FIG. 2 (PRIOR ART)
FIG. 2 is an exploded, perspective view of a prior art pneumatic impact wrench having a motor housing with a forward egressing exhaust port.

Referring to FIG. 2 which is an exploded view of a prior art pneumatic impact wrench having a motor housing 14 lacking an exhaust port and a hammer case having a front forward egressing exhaust port. The pressurized air ingresses the rear of the cylinder, which is inserted into the motor housing 14, and rotates a rotor (not shown) within the cylinder 60. The pressurized air egresses from the cylinder exhaust opening 62 through the motor housing exhaust opening 20 through the hammer housing exhaust port 75 in hammer case 71 thereby directing the pressurized air in a frontal direction toward the working area.

Figure 3:
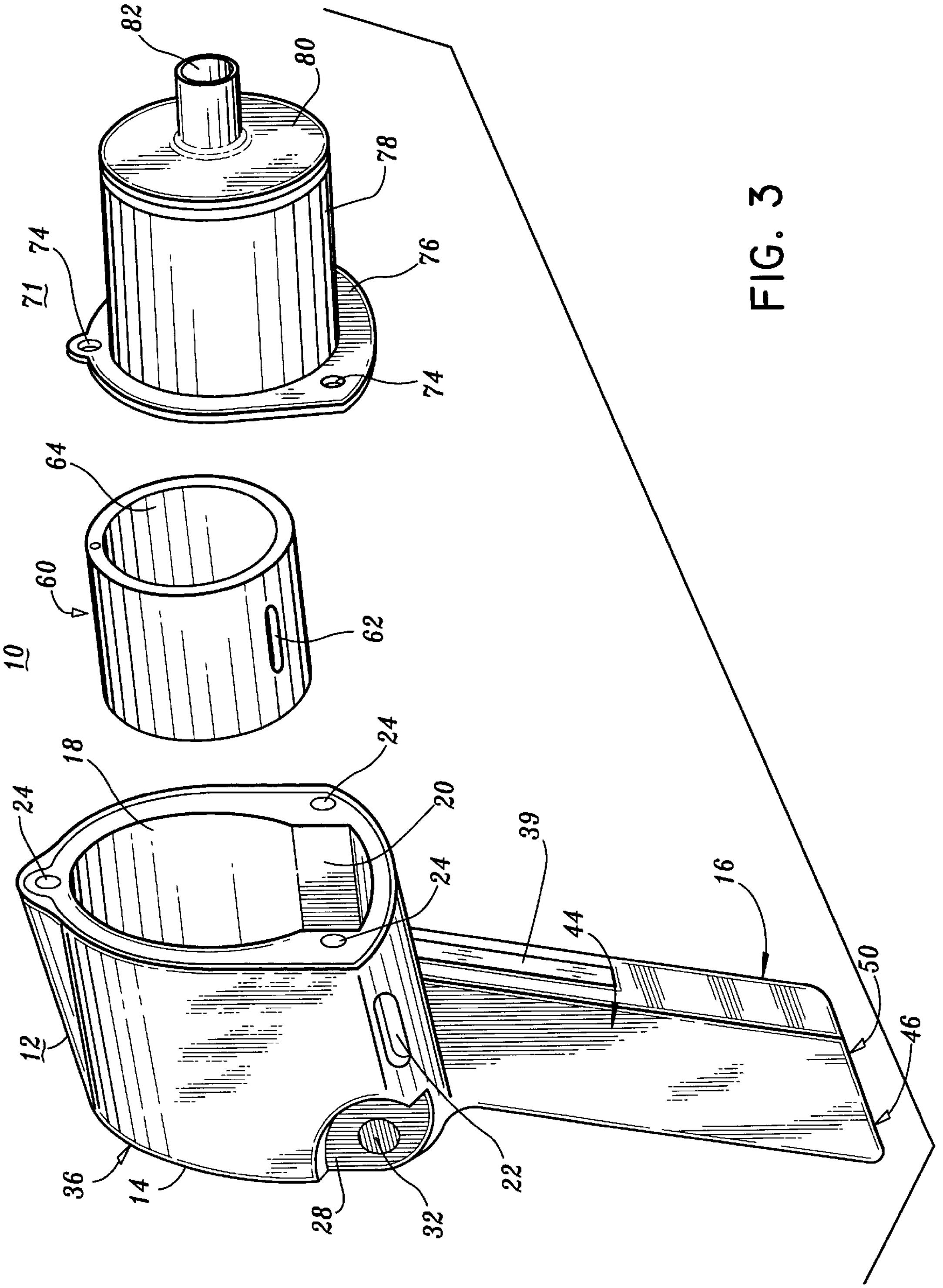
FIG. 3 is an exploded, perspective view of one embodiment of the presently disclosed pneumatic tool having a side exhaust opening.
Figure 4:
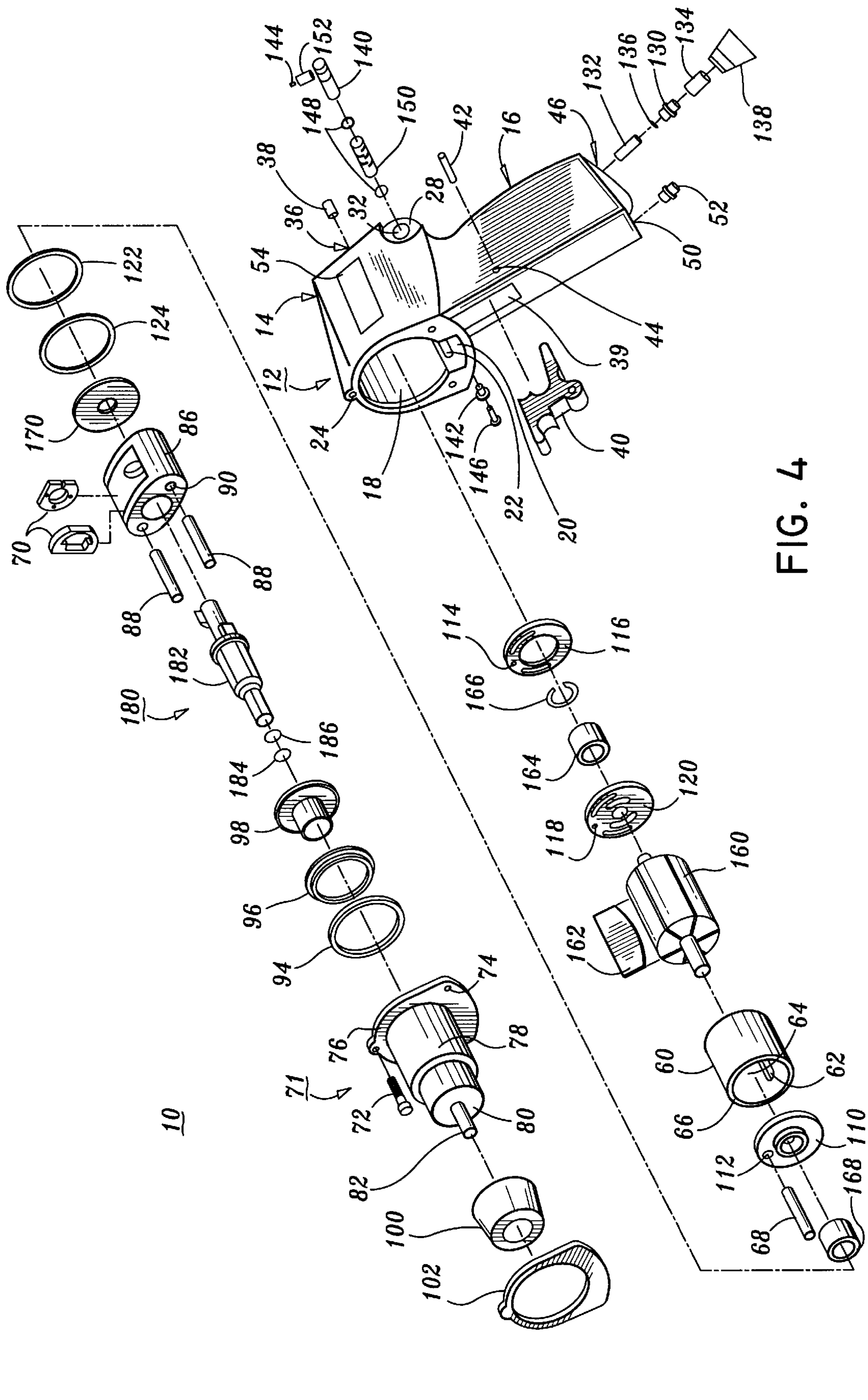
FIG. 4 is an exploded, perspective view of the pneumatic tool shown in FIG. 3 illustrating the internal components of the drive assembly.

Referring to FIG. 3 and FIG. 4, one embodiment of the presently disclosed pneumatic tool is shown generally as 10. Pneumatic tool 10, which is shown here as an impact wrench, includes a first housing 12 consisting of a first motor housing portion 14 and a first handle housing portion 16 which are pneumatically and securely connected together. The first motor housing portion 14 has a first motor housing cylinder receptacle 18 contained therein within which a cylinder 60 is inserted with a cylinder exhaust port 62 facing in a downward direction. At a lower portion of the first motor housing cylinder receptacle 18 is a first motor housing exhaust opening 20 having a first motor housing exhaust opening port 22 contained therein. The first motor housing exhaust opening port 22 can open on a side and/or rear and or top and/or bottom of the first motor housing exhaust opening 20.

The first motor housing portion 14 has a plurality of first motor housing cap screw receptacles 24 in which complimentary hammer case cap screws 72 are secured. The first motor housing portion 14 also has a first motor housing reverse valve indent 28 within which a reverse valve knob 142 rotates. In the center of the first motor housing reverse valve indent 28 is a first motor housing reverse valve receptacle 32 in which a reverse valve 140 is positioned. The first motor housing portion 14 has a first motor housing grease fitting receptacle 36 in which lubricant is added and a complimentary grease fitting 38 is securely and removably fastened therein. The first handle housing portion 16 has a first handle housing trigger receptacle 39 within which a trigger 40 is pivotally mounted upon a trigger pin 42 which is securely mounted within a first handle housing trigger pin receptacle 44. The first handle housing portion 16 has a first handle housing throttle valve receptacle 46 in which a throttle valve 130 is positioned. Pressurized air ingresses through the throttle valve 130. In addition, the first handle housing portion 16 has a first handle housing oil chamber plug receptacle 50 in which lubricant is added and an oil chamber plug 52 is securely and removably fastened therein. A first housing label 54 having indicia thereon preferably indicating the manufacture thereof is optionally affixed on the first housing 12.

A first hammer case 71 is pneumatically sealed and removably fastened over the first motor housing cylinder receptacle 18 utilizing a plurality of hammer case cap screws 72 through a plurality of first hammer case rear plate cap screw openings 74. The first hammer case 71 consists of a first hammer case rear plate 76 which lacks an exhaust port described in the prior art. The first hammer case rear plate 76 is pneumatically sealed and securely fastened to a first hammer case middle cylinder 78. The first hammer case middle cylinder 78 is pneumatically sealed and securely fastened to a first hammer case front plate 80 having a first hammer case anvil receptacle 82 therein. Within the first hammer case 71 is a hammer 70 which comprises a hammer frame 86 having a pair of hammer frame pins 88 inserted through respective hammer frame pin receptacles 90. Within the first hammer case 71 is a pair of hammers 70 through which an anvil 180 is positioned. A hammer case gasket is positioned adjacent to the first hammer case rear plate which forms the pneumatic seal in conjunction with a hammer case pilot 96. A hammer case bushing 98 is inserted through the first hammer case anvil receptacle 82. The anvil 180 rotates freely within the hammer case bushing 98. A hammer case shield 100 is inserted over the first hammer case anvil receptacle 82. A hammer grommet 102 is placed over the first hammer case rear plate 76 of the first hammer case 71.

The cylinder 60 has a cylinder exhaust port 62 which is positioned in a downward direction toward the first motor housing exhaust opening 20. In the cylinder 60 is a cylinder rotor receptacle 64 within which a rotor 160 freely rotates. A cylinder dowel receptacle 66 is positioned on a periphery of the cylinder 60. A cylinder dowel 68 is inserted through the cylinder dowel receptacle 66 and through a front end plate dowel receptacle 112 of a front end plate 110 and through the front end plate gasket dowel receptacle 114 of a front end plate gasket 116 and through a rear end plate dowel receptacle 118 of a rear end plate 120. A motor clamp washer 122 and a clamp washer 124 are positioned adjacent to the front end plate 110.

A throttle valve stem 132 is inserted through a throttle valve spring 134, a throttle valve face 136, and the throttle valve 130. An air strainer 138 is integrally attached to the throttle valve 130. Pressurized air ingresses through the throttle valve 130 which is usually connected to an air compressor. A reverse valve 140 comprises a reverse valve knob 142 which is securely fastened to a reverse valve detent ball 144 by a reverse valve knob screw 146. The reverse valve knob screw 146 is inserted through a reverse valve bushing seal 148, a reverse valve bushing 150, the reverse valve 140, and a reverse valve detent spring 152.

The rotor 160 has a plurality of rotor vanes 162 extending therefrom. When pressurized air contacts the plurality of rotor vanes 162 rotation of the rotor 160 occurs. The rotor 160 has a rotor rear bearing 164 with a rotor rear bearing retainer 166 positioned at a rear distal end within a rear portion of the first motor housing 14 and a rotor front bearing 168 positioned at a front distal end between the front end plate gasket 116 and a rear washer 170. A front distal end of the rotor 160 is integrally connected to a rear distal end of the anvil 180.

The anvil 180 can have varying lengths such as an anvil standard length 182 (as shown) or an anvil extended length (not shown). A front distal end of the anvil 180 is inserted through an anvil socket retainer 184 and an anvil retainer O-Ring 186 which forms a pneumatic seal with the hammer case shield 100.

Figure 3A:
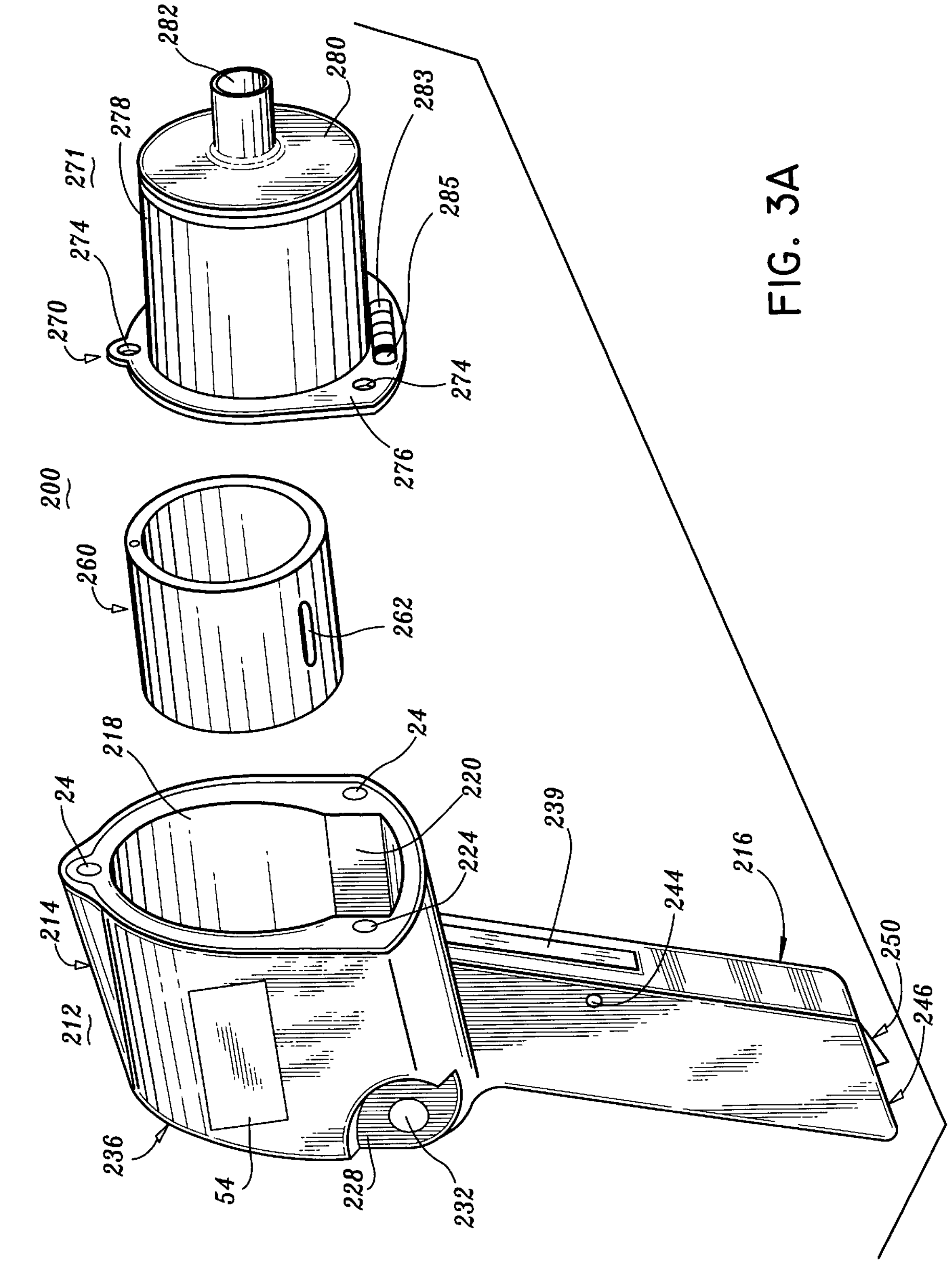
FIG. 3A is an exploded, perspective view of another embodiment of the presently disclosed pneumatic tool.

FIG. 3A illustrates an exploded view of a second pneumatic tool 200, wherein like reference numerals designate corresponding elements of pneumatic tool 10. Pneumatic tool 200 includes a second housing 212 and a hammer case 271. The pneumatic tool in this drawing is an impact wrench. A front sideways egressing exhaust port of pneumatic tool 200 is formed in housing 212. The housing includes a motor housing portion 214 and a handle housing portion 216 which are pneumatically and securely connected together. Motor housing 214 has a motor housing cylinder receptacle 218 contained therein within which a cylinder 260 is inserted with a cylinder exhaust port 262 facing in a downward direction. At a lower portion of the second motor housing cylinder receptacle 218 has a motor housing exhaust opening 220 which may optionally have a motor housing exhaust opening port (not shown) contained therein. The optional motor housing exhaust opening port (not shown) can open on a side and/or rear and or top and/or bottom of the motor housing exhaust opening 220. The prior art pneumatic tool as described in FIG. 1 and FIG. 2 lacks the optional motor housing exhaust opening port (not shown) as well as lacks a hammer case rear plate exhaust port 283. The motor housing 214 has a plurality of motor housing cap screw receptacles 24 in which complimentary hammer case cap screws 72 are secured. The motor housing 214 also has a motor housing reverse valve indent 28 within which a reverse valve knob 142 rotates. In the center of the motor housing reverse valve indent 28 is a motor housing reverse valve receptacle 32 in which a reverse valve 140 is positioned. The motor housing 214 has a second motor housing grease fitting receptacle 236 in which lubricant is added and a complimentary grease fitting 38 is securely and removably fastened therein. The handle housing 216 has a handle housing trigger receptacle 239 within which a trigger 40 is pivotally mounted upon a trigger pin 42 which is securely mounted within a handle housing trigger pin receptacle 244. The handle housing 216 has a handle housing throttle valve receptacle 246 in which a throttle 130 is positioned. Pressurized air ingresses through the throttle valve 130. In addition, the handle housing portion 216 has a handle housing oil chamber plug receptacle 250 in which lubricant is added and an oil chamber plug 52 is securely and removably fastened therein. A housing label 254 having indicia thereon preferably indicating the manufacturer thereof, is optionally affixed on the.

A hammer case 271 is pneumatically sealed and removably fastened over the motor housing cylinder receptacle 218 utilizing a plurality of hammer case cap screws 72 through a plurality of hammer case rear plate cap screw openings 274. The hammer case 271 consists of a hammer case rear plate 276 has a hammer case rear plate exhaust port 283 frontwardly enclosed within a hammer case rear plate exhaust port shroud 285. The hammer case rear plate exhaust port shroud 285 functions to direct the forward egressing pressurized air flow to a sideways direction. The hammer case rear plate 276 is pneumatically sealed and securely fastened to a hammer case middle cylinder 278. The second hammer case middle cylinder 278 is pneumatically sealed and securely fastened to a hammer case front plate 280 having a hammer case anvil receptacle 282 therein. Within the hammer case 271 is a hammer 70 which comprises a hammer frame 86 having a pair of hammer frame pins 88 inserted through respective hammer frame pin receptacles 90. Within the second hammer case 271 is a pair of hammers 70 through which an anvil 180 is positioned. A hammer case gasket 94 is positioned adjacent to the hammer case rear plate 276 which forms the pneumatic seal in conjunction with a hammer case pilot 96. A hammer case bushing 98 Is inserted through the second hammer case anvil receptacle 282. The anvil 180 rotates freely within the hammer case bushing 98. A hammer case shield 100 is inserted over the hammer case anvil receptacle 282. A hammer grommet 102 is placed over the hammer case rear plate 276 of the second hammer case 271.

It will be understood that each of the elements described above, or two or more together, may also find a useful application in other types of constructions differing from the type described above.

While the invention has been illustrated and described as embodied in a pneumatic tool, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set fort in the appended claims:

1. A pneumatic tool comprising:

a housing having a motor housing portion and a handle portion, the motor housing portion defining a receptacle and the handle portion including an inlet port adapted to be connected to a pneumatic source, the housing further having a channel therein, the channel extending from the inlet port to the receptacle;

a rotor having a longitudinal axis, the rotor being rotatably supported about the longitudinal axis within the receptacle; and an exhaust opening formed in a sidewall of the motor housing portion, the exhaust opening being configured to direct exhaust flowing from the rotor in a direction away from the longitudinal axis of the rotor.

2. A pneumatic tool according to claim 1, wherein the pneumatic tool is an impact wrench and the pneumatic tool further includes an anvil operatively connected to the rotor, wherein rotation of the rotor effects rotation of the anvil.

3. A pneumatic tool according to claim 2, further including a throttle valve positioned within the channel.

4. A pneumatic tool according to claim 3, wherein the throttle valve is located in the handle portion of the housing.

5. A pneumatic tool according to claim 2, further including a cylinder positioned within the receptacle about the rotor, the cylinder including an exhaust port configured to direct exhaust air in a direction perpendicular to the longitudinal axis of the rotor.

6. A pneumatic tool according to claim 5, further including an exhaust channel formed in the motor housing portion, the exhaust channel communicating with receptacle via the exhaust port formed in the cylinder.

7. A pneumatic tool according to claim 1, further including a trigger pivotably secured to the handle portion, the trigger being operable to control air flow through the channel.

8. A pneumatic tool according to claim 1, further including a reverse valve, the reverse valve being rotatably supported within the housing and being operable to control the direction of air flow into the rotor.

9. A pneumatic tool according to claim 1, further including a strainer positioned adjacent the inlet port.

* * * * *